March 30, 1965  T. A. ROGERS  3,175,842
CRANK ARM AXLE
Filed April 5, 1962
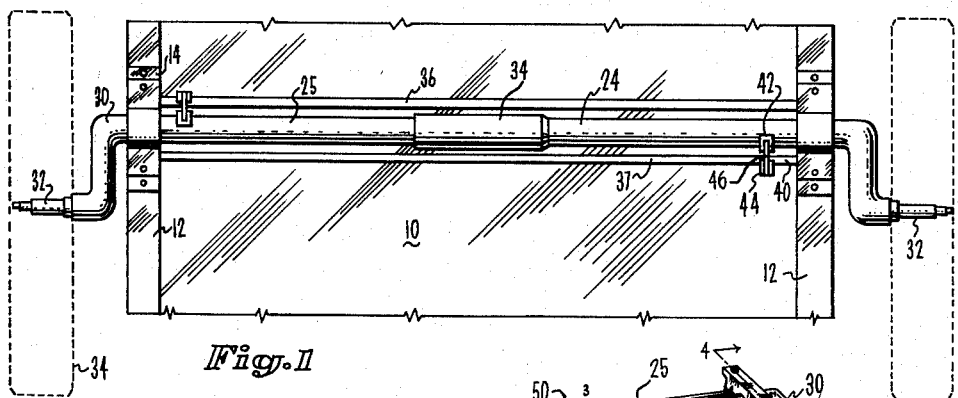
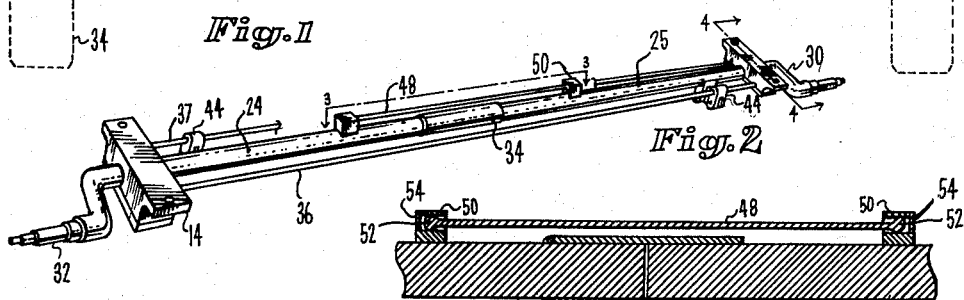
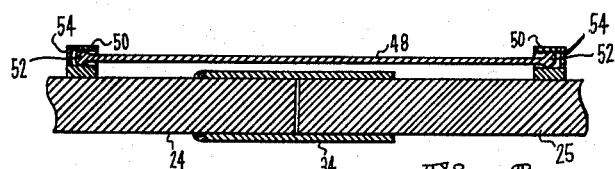
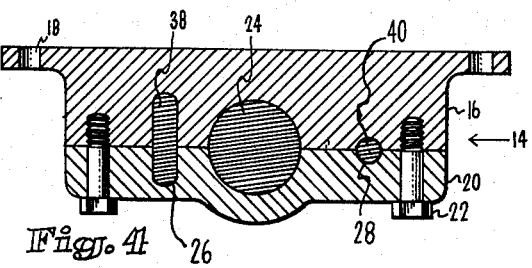
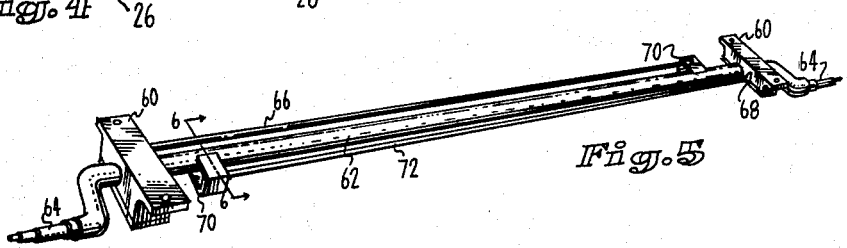
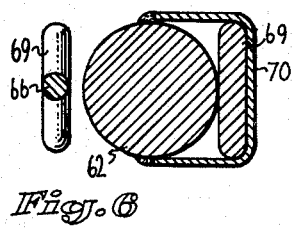
Thelmer A. Rogers
INVENTOR.
BY
Atty.

United States Patent Office 3,175,842
Patented Mar. 30, 1965

3,175,842
CRANK ARM AXLE
Thelmer A. Rogers, % Lubbock Machine & Supply,
P.O. Drawer 1589, Lubbock, Tex.
Filed Apr. 5, 1962, Ser. No. 185,453
3 Claims. (Cl. 280—124)

This invention relates to vehicle suspension and more particularly to trailer suspension wherein the axle is cranked.

In recent years many trailers have frames mounted upon an axle which has a crank arm thereon. I.e., the axle is mounted for rotation relative to the frame of the trailer. The wheel is mounted upon a spindle, the spindle being parallel, but off-set from the axis rotation of the axle. Therefore, the weight of the trailer will tend to rotate the axle. This rotation is opposed by springs.

I have invented a new spring to accomplish the biasing or applying of torque to the axle in the opposite direction to which it would be rotated by the trailer frame.

An object of this invention is to provide an improved crank type suspension for vehicles.

Another object is to provide a better crank suspension for vehicles which is simple in design yet permits large angle rotation of the axle.

Another object is to provide such a device which reduces the bulkiness of the undercarriage of the vehicle.

A further object is to provide such a device which is economical to construct.

A further object is to provide such a device wherein damaged springs may be replaced inexpensively and easily.

A still further object is to provide a co-axial crank type system which is adaptable so that the two wheels on opposite sides of the vehicle may move together as a unit or be independent or have any degree of connection therebetween.

Still further objects are to achieve the above with a device that is sturdy, compact, durable, simple and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a bottom view showing a part of a trailer with one embodiment of the improved axle and springs.

FIG. 2 is a perspective view of the improved axle, bearings, and springs as shown in FIG. 1.

FIG. 3 is an axial sectional view taken on line 3—3 of FIG. 2.

FIG. 4 is a cross-sectional view taken on line 4—4 of FIG. 2.

FIG. 5 is a perspective view of a second embodiment of the axle, bearings, and springs.

FIG. 6 is a cross-sectional view taken on line 6—6 of FIG. 5.

As may be seen in the drawings, particularly FIG. 1 the purpose of the invention is to support a vehicle in the form of trailer 10 which includes frame 12. Bearing assembly 14 is attached on each side of the vehicle to the frame 12.

Each bearing assembly 14 (FIG. 4) includes base 16 which has holes 18 for bolts to attach the base 16 to the vehicle's frame 12. Each bearing assembly 14 has a cap 20 attached to the base 16 by bolts 22. Axle 24 is journaled for rotation between the base 16 and the cap 20 of one assembly 14 and axle 25 of the other. The bearings assemblies 14 are co-axial, holding the axles 24 and 25 co-axial. Cavity 26 is formed in each assembly 14 between the base 16 and the cap 20 by means of an elongated slot in each for purposes to be explained later. Also, the assembly, the embodiment shown in FIGS. 1–4. includes second cavity 28 formed by a semi-cylindrical notch in both the cap 20 and the base 16 for purposes to be described later.

The outboard end of each axle 24 and 25 is cranked at 30. Spindle 32 is on the extremity of the crank. It is a means for mounting wheel 34 to each axle. It will be seen in the relaxed position, or with equal strain on both wheels 34, that the two spindles 32 will be co-axial and that the axis of the spindles will be parallel to the axis of the axles 24 and 25. Sleeve 34 is telescoped over axle 24 and welded thereto. It extends past the inboard end of axle 24 and telescopes over axle 25, thus maintaining the axles co-axial at this point.

The torque to resist the movement of the vehicle frame 12 in the downward direction is provided by a pair of torsion springs 36 and 37. The torsion springs are in the form of an elongated bar which lies alongside the two axles 24 and 25. The torsion springs 36 and 37 are parallel to the axles 24 and 25. One end of spring 36 has a flat protuberance 38 upon the end thereof. The flat protuberance 38 fits within the cavity 26 and is clamped in place by the bolt 22. The other end 40 of the spring 36 is cylindrical and is journaled for rotation within cavity 28 of the other bearing 14 so that it is free to move axially.

The other spring 37 likewise has a protuberance 38 on one end which is clamped tightly to one bearing 14 and has a second end 40 which is journaled for rotation to the other bearing 14.

Near the bearing but inboard thereof, axle 24 has arm 42 welded thereto. The spring 37 has arm 44 securely attached to it by welding or otherwise. The arm 44 is near the end 40 and opposite arm 42. Link 46 is pivoted between the ends of the arms 42 and 44. In a like manner the spring 36 is linked to the axle 25. The arms and links together form a means for rotating the end 40 of each spring 36 and 37 responsive to rotation of one of the axles 24 and 25. The protuberance 38 of each spring 36 and 37 is attached to an object which is rigidly attached to the vehicle frame 12.

As described above each axle 24 and 25 is free to rotate about its axis independently of the other axle.

If it is desired that the rotation of one of the axles 24 and 25 effects the rotation of the other axle, then they may be connected by torsion spring 48 (FIG. 3). The torsion spring 48 is an elongated bar which lies alongside the axle 24 and the axle 25. It is parallel to the axles. Strap 50 is welded to each of the axles to form a non-circular space, between the strap 50 and the axle. Each end of the spring 48 has flat protuberance 52 thereon. The shape of the protuberance 52 is correlative to the shape of the space between the strap 50 and the axles 24 and 25 so that the end of the spring 48 is limited to axial movement with respect to the axle. Axial movement of the spring 48 is limited by end plates 54 welded to the axle. Thus, the protuberance 52 and strap 50 forms a means for rotating each end of the spring 48 responsive to rotation of one of the axles. Therefore, rotation of the axle 24 relative to the axle 25 will induce a torque in the spring 48 so that the two axles are connected in this manner. The length and diameter of the torsion spring 48 will determine the degree to which the two crank axles 24 and 25 move in unison.

Additional connecting springs 48 may be added. While the embodiment illustrated in FIGS. 1–4 has been discussed as having two axles, it will be understood that it could be analyzed equally accurately as if there were one axle which was joined together at the middle by the sleeve 34 so that the separate ends of the same axle were free to rotate one to the other.

The embodiment illustrated in FIGS. 5–6 has bearings 60 which are similar to the bearings 14 of the previous embodiment. In this embodiment, axle 62 is integral with the two ends connected together. Both ends of the axle 62 are cranked and both ends have means 64 for mounting a wheel thereon. Torsion spring 66 is anchored to one bearing 60 by protuberance (not shown) which fits within a slot within the bearing. The other end has a protuberance 69 which fits within strap 70 which is attached to the axle 62 so that there is a non-circular space between the strap 70 and the axle. The protuberance 68 is clamped tightly in the bearing 60 so that there is no axial movement. However, the protuberance 69 is free to move axially within the strap 70. The spring 66 is in the form of an elongated bar which lies alongside the axle 62. Likewise, there is another spring 72 in the form of an elongated bar which lies alongside the axle 62 and fits within a second strap 70 attached to the axle as described above. The spring 72 has protuberances 68 and 69 on the ends thereof which are clamped in one of the bearings 60 and held against rotation relative to the axle 62 by the strap 70.

It may be seen in this embodiment that the straps 70 and protuberances 69 form means whereby springs 66 and 72 are each rotated responsive to rotation of the axle 62. Likewise the protuberance 68 is means for attaching that end of each spring 66 and 72 to an object which is fixed to the frame 12 of the vehicle.

It will be understood that many variations might be made and certain refinements have not been illustrated, e.g. the bearings have been shown in their most elementary form. It will be understood that any type of a bearing could be used which may have elaborate anti-friction means and means to limit the axial movement of the axles.

It will be apparent that the embodiments shown are only exemplary and that various modifications can be made in construction, materials, and arrangement within the scope of the invention as defined in the appended claims.

I claim as my invention:
1. In a wheel suspension for vehicles having
   (a) a pair of bearings adapted to be attached to a vehicle frame,
   (b) an axle mounted for rotation in the bearings,
   (c) both ends of the axle being cranked,
   (d) each end of the axle having means for mounting a wheel thereon,
   the improved spring system comprising:
      (e) a torsion spring,
      (f) the spring in the form of a straight bar,
      (g) the bar lying alongside the axle,
      (h) one end of the bar attached to one of the bearings against rotation about its axis, and
      (i) means for connecting the bar to the axle so that rotation of the axle results in rotation of the bar,
      (j) the means for connecting the bar to the axle located on the axle between the bearings,
      (k) each end of the bar has a protuberance,
      (l) one protuberance fitted in a slot on the bearing,
      (m) a strap attached to the axle,
      (n) the strap forming a non-circular space with the axle, and
      (o) the other protuberance fitted into said non-circular space.

2. In a wheel suspension for vehicles having
   (a) a pair of bearings adapted to be attached to a vehicle frame,
   (b) an axle mounted for rotation in the bearings,
   (c) both ends of the axle being cranked,
   (d) each end of the axle having means for mounting wheel thereon,
   the improved spring system comprising:
      (e) a torsion spring,
      (f) said spring in the form of a straight bar,
      (g) the bar lying along side the axle and fixed at one end to one of the bearings,
      (h) the other end of the bar having a protuberance thereon,
      (i) a strap attached to the axle,
      (j) said strap forming a noncircular space with the axle,
      (k) said protuberance fitted into said noncircular space.

3. The invention as defined in claim 2 wherein a second torsion spring is provided, also lying along side the axle and fixed at one end to the other of said bearings,
   (l) the other end of said second torsion spring likewise having a protuberance,
   (m) said axle having a second strap attached thereto
   (n) said second strap forming noncircular space with the axle, and
   (o) said last mentioned protuberance of the other end fitted into said noncircular space formed with said second strap.

References Cited by the Examiner

UNITED STATES PATENTS

| | | | |
|---|---|---|---|
| 2,213,004 | 8/40 | Hickman. | |
| 2,254,261 | 9/41 | Best | 267—11 |
| 2,542,363 | 2/51 | Sarnac | 267—57 |
| 2,684,237 | 7/54 | Kayler | 280—124 X |
| 3,054,625 | 9/62 | Haley | 280—124 |

FOREIGN PATENTS

| | | |
|---|---|---|
| 149,718 | 8/20 | Great Britain. |
| 1,002,435 | 10/51 | France. |

A. HARRY LEVY, *Primary Examiner.*

LEO FRIAGLIA, *Examiner.*